United States Patent

[11] 3,587,420

| [72] | Inventors | Helenio Llop<br>Creteil, France;<br>Societe D'Optique Precision, Electronique<br>Et Mecanique "Sopelem,",, Paris, France |
|------|-----------|---|
| [21] | Appl. No. | 668,299 |
| [22] | Filed | Sept. 13, 1967 |
| [45] | Patented | June 28, 1971 |
| [32] | Priority | Sept. 20, 1966 |
| [33] | | France |
| [31] | | 76,907 |

[54] AUTOMATIC CAMERA DIAPHRAGM SYSTEM
2 Claims, 3 Drawing Figs.

[52] U.S. Cl. .................................................. 95/10C,
    95/64R, 250/229, 318/18, 330/40, 352/141
[51] Int. Cl. .................................................. G03b 7/10,
    G03b 19/18
[50] Field of Search .......................................... 95/10 (C),
    64; 352/141; 250/211, 229; 330/22, 40, 18;
    318/20.450, 20.605; 307/215

[56] References Cited
UNITED STATES PATENTS

| 3,365,675 | 1/1968 | Gaddy et al. | 330/40UX |
| 3,430,053 | 2/1969 | Westhaver | 352/141UX |
| 3,259,761 | 7/1966 | Narud et al. | 307/215 |
| 3,476,028 | 11/1969 | Namba et al. | 95/10(C)X |

OTHER REFERENCES

G.E. Transistor Manual, Seventh Edition, 1964, (Copy in Group Art Unit 281). (pp. 96, 97, 106 and 107)

*Primary Examiner*—Samuel S. Matthews
*Assistant Examiner*—Joseph F. Peters, Jr.
*Attorney*—Cameron, Kerkam and Sutton

ABSTRACT: An automatic camera diaphragm control uses a photo resistant cell which receives light through the diaphragm. The cell is supplied with an adjustable constant current. An overall sensitivity results which is independent of nominal illumination and which depends solely on the relative variations of illumination.

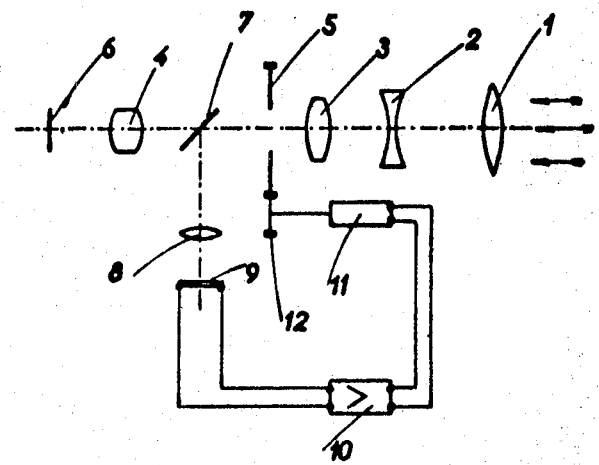
Fig: 1
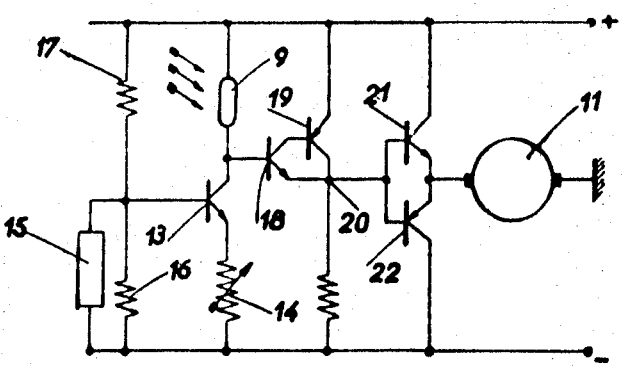
Fig: 2
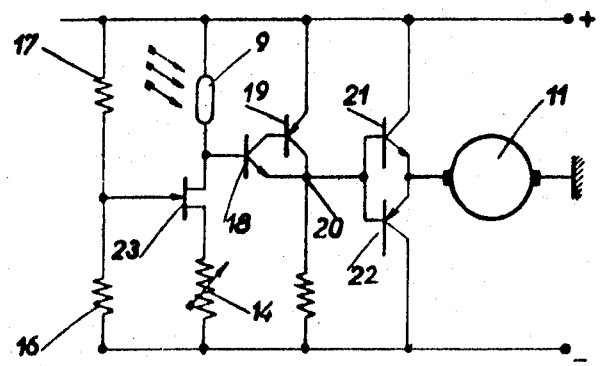
Fig: 3

AUTOMATIC CAMERA DIAPHRAGM SYSTEM

The invention relates to automatic camera diaphragm control systems.

The object of the invention is to control the nominal illumination which determines the control point, depending upon the film speed, and to provide a system with an overall sensitivity which is independent of the nominal illumination and which depends solely on the relative variations of such illumination.

According to the invention, the system comprises a photoresistant cell which receives light through the diaphragm, and means for supplying an adjustable constant current to said cell.

The invention will be described by way of examples with reference to the accompanying drawings, wherein:

FIG. 1 is a general diagram showing a control system in accordance with the invention;

FIG. 2 is a diagram of one form of electronic amplifier for actuating the diaphragm drive motor in the system of FIG. 1; and FIG. 3 illustrates an alternative form of amplifier for the system of FIG. 1.

A lens with the automatic diaphragm is shown in FIG. 1 comprising lens elements 1, 2, 3 and 4 receiving the rays of light, and a diaphragm 5 which is required to be adjusted automatically, the rays of light forming an image in the plane of the film 6.

A small fraction of the light is reflected by a mirror 7 to the photoresistant cell 9 through an optical system 8. An electronic amplifier 10 receives the current from the photoresistant cell 9 and feeds a motor 11 controlling the diaphragm 5 via a gearwheel 12.

For a given film speed setting, the cell 9 receives a constant illumination via the diaphragm 5 so that the film 6 is also illuminated at a constant value.

FIG. 2 is a diagram of the amplifier 10 feeding the motor 11.

The cell 9 is fed with a constant current because it is situated in the circuit of tee collector of a transistor 13 which has a very high negative feedback via a resistor 14 disposed in the emitter circuit. The base of the transistor 13 is fed at low impedance. A heat-sensitive device, 15 such as a thermistor, ensures that the settings remain constant over a suitable temperature range, i.e. the voltage remains constant irrespective of the temperature.

The resistors 16, 17 fix the base potential of the transistor 13 at a constant value.

The cell 9 is fed with a constant current via the transistor 13. Variations in illumination or lighting of the subject result in variations of tee resistance of cell 9 and the resultant voltage variations at the terminals of the cell are transmitted by impedance matching transistors 18 and 19 which deliver the voltage variations at the same value but at a very low impedance at a point 20. The transistors 18 and 19 together therefore provide a suitable drive for the bases of the transistors 21 and 22 which form the output stages. The transistors 21 and 22, only one of which can conduct according to the polarity of the voltage variations of the terminals of the cell 9, are connected with a common collector circuit to provide a voltage to drive the motor 11. A mechanical reduction gearing can be provided between the motor 11 and the diaphragm.

With the above described circuit, cell 9 is fed with a constant current and control of the nominal illumination which defines the control point, i.e. the film speed setting, is obtained by controlling the constant current through the cell 9, for example by varying the adjustable resistor 14. The overall sensitivity of the system is independent of the nominal illumination and depends solely on the relative variations thereof.

FIG. 3 illustrates a variant embodiment in which the transistor 13 is replaced by a field-effect transistor which feeds the cell 9 with a constant current and does not introduce any temperature drift.

With the field-effect transistor 23 the thermistor 15 can be dispensed with.

Of course the invention is not limited by the above-described embodiment details which can be modified without departing from the scope of the invention. For example, the motor 11 could be replaced by the frame of a galvanometer without a return spring coupled to tee diaphragm blades, the current through the frame causing the latter to turn and adjust the diaphragm until its position of equilibrium has been reached.

I claim:

1. An automatic camera diaphragm control system comprising an adjustable diaphragm, electric motor means for automatically adjusting the opening of said diaphragm operatively connected to said diaphragm, a photoelectric cell receiving a portion of the light passing through said diaphragm and means for feeding said cell with an adjustable constant electric current, said means including a source of electric power, a transistor, a base for said transistor, a collector for said transistor connected to one side of said photoelectric cell, an emitter for said transistor, a variable resistance connected to said emitter and to one side of said source and two resistances in series connected across said source, said base being connected between said resistances, the other side of said cell being connected to the other side of said source, and circuit means supplying voltage variations at said cell to said electric motor means.

2. A system as described in claim 8, said circuit means including impedance matching transistors having one base thereof connected between said first-named transistor and said cell, output transistors having their bases connected to the collector and emitter of said impedance matching transistors and a collector circuit connected to the emitters of said output transistors and to said electric motor means.